United States Patent
Smith

(10) Patent No.: US 10,600,448 B2
(45) Date of Patent: Mar. 24, 2020

(54) STREAMING DIGITAL MEDIA BOOKMARK CREATION AND MANAGEMENT

(71) Applicant: Paul Smith, San Francisco, CA (US)

(72) Inventor: Paul Smith, San Francisco, CA (US)

(73) Assignee: THEMOMENT, LLC, San Francisco, CA (US)

( * ) Notice: Subject to any disclaimer, the term of this patent is extended or adjusted under 35 U.S.C. 154(b) by 0 days.

(21) Appl. No.: 15/673,641

(22) Filed: Aug. 10, 2017

(65) Prior Publication Data
US 2018/0047429 A1  Feb. 15, 2018

Related U.S. Application Data

(60) Provisional application No. 62/373,244, filed on Aug. 10, 2016.

(51) Int. Cl.
| | |
|---|---|
| *G11B 27/34* | (2006.01) |
| *H04N 21/472* | (2011.01) |
| *H04N 21/84* | (2011.01) |
| *H04N 21/845* | (2011.01) |
| *G11B 27/031* | (2006.01) |
| *H04N 21/858* | (2011.01) |

(52) U.S. Cl.
CPC ............ *G11B 27/34* (2013.01); *G11B 27/031* (2013.01); *H04N 21/47205* (2013.01); *H04N 21/84* (2013.01); *H04N 21/8456* (2013.01); *H04N 21/8586* (2013.01)

(58) Field of Classification Search
CPC combination set(s) only.
See application file for complete search history.

(56) References Cited

U.S. PATENT DOCUMENTS

| | | | |
|---|---|---|---|
| 2004/0239763 A1* | 12/2004 | Notea | H04N 5/222 348/169 |
| 2007/0154190 A1* | 7/2007 | Gilley | G11B 27/034 386/241 |
| 2009/0292685 A1* | 11/2009 | Liu | G06F 16/73 |
| 2010/0180218 A1* | 7/2010 | Boston | G06F 3/0481 715/759 |
| 2010/0205529 A1* | 8/2010 | Butin | G06F 9/453 715/704 |
| 2011/0047571 A1* | 2/2011 | Zhang | H04N 7/17318 725/40 |

(Continued)

*Primary Examiner* — Thai Q Tran
*Assistant Examiner* — Sunghyoun Park
(74) *Attorney, Agent, or Firm* — Bachmann Law Group PC

(57) ABSTRACT

A user can quickly and efficiently create, edit, search, playback and share bookmarks in one or more videos that are pre-recorded or being recorded or streaming live. The bookmark includes reference to a portion of the video for an amount of time. The bookmark portions may not include a specified end time. The bookmark may include the source of the video, a start time of the bookmarked portion of the video stream or file, a length of the referenced video portion, and content such as text, emoticons, or other content received from a user that creates, edits, or manages the bookmark. The bookmarks may be grouped together into a set of bookmarks, thereby forming an edit of the original streaming or pre-recorded videos when played sequentially, wherein the edit includes a set of bookmarked video portions (bookmarked videos) taken from one or more particular live streaming or pre-recorded videos.

20 Claims, 15 Drawing Sheets

(56) References Cited

U.S. PATENT DOCUMENTS

| | | | | |
|---|---|---|---|---|
| 2011/0142420 A1* | 6/2011 | Singer | ............... | G06Q 30/00 |
| | | | | 386/280 |
| 2012/0072845 A1* | 3/2012 | John | ............... | G06F 16/48 |
| | | | | 715/738 |
| 2012/0166950 A1* | 6/2012 | Frumar | ............ | G06F 3/04883 |
| | | | | 715/719 |
| 2012/0266069 A1* | 10/2012 | Moshiri | ............ | G06F 3/0346 |
| | | | | 715/719 |
| 2015/0100993 A1* | 4/2015 | Lee | ............... | H04N 5/765 |
| | | | | 725/90 |
| 2015/0180820 A1* | 6/2015 | Lee | ............... | G06Q 50/01 |
| | | | | 709/206 |
| 2016/0085860 A1* | 3/2016 | Wallenberg | ......... | G06F 16/73 |
| | | | | 707/706 |

\* cited by examiner

STREAMING DIGITAL MEDIA BOOKMARK CREATION AND MANAGEMENT

CROSS REFERENCE TO RELATED APPLICATIONS

The present application claims the priority benefit of U.S. Provisional Patent Application No. 62/373,244, filed Aug. 10, 2017, the disclosure of which is incorporated herein by reference.

SUMMARY

The present technology allows a user to quickly and efficiently create, edit, search, playback and share bookmarks in one or more videos that are pre-recorded or being recorded or streaming live. The bookmark includes reference to a portion of the video for a particular amount of time. In some instances, the bookmark portions may not include a specified end time. The bookmark may include the source of the video, a start time of the bookmarked portion of the video stream or file, a length of the referenced video portion, and content such as text, emoticons, or other content received from a user that creates, edits, or manages the bookmark. The bookmarks may be grouped together into a set of bookmarks, thereby forming an edit of the original streaming or pre-recorded videos when played sequentially, wherein the edit includes a set of bookmarked video portions (bookmarked videos) taken from one or more particular live streaming or pre-recorded videos.

DETAILED DESCRIPTION

Figure 1A:
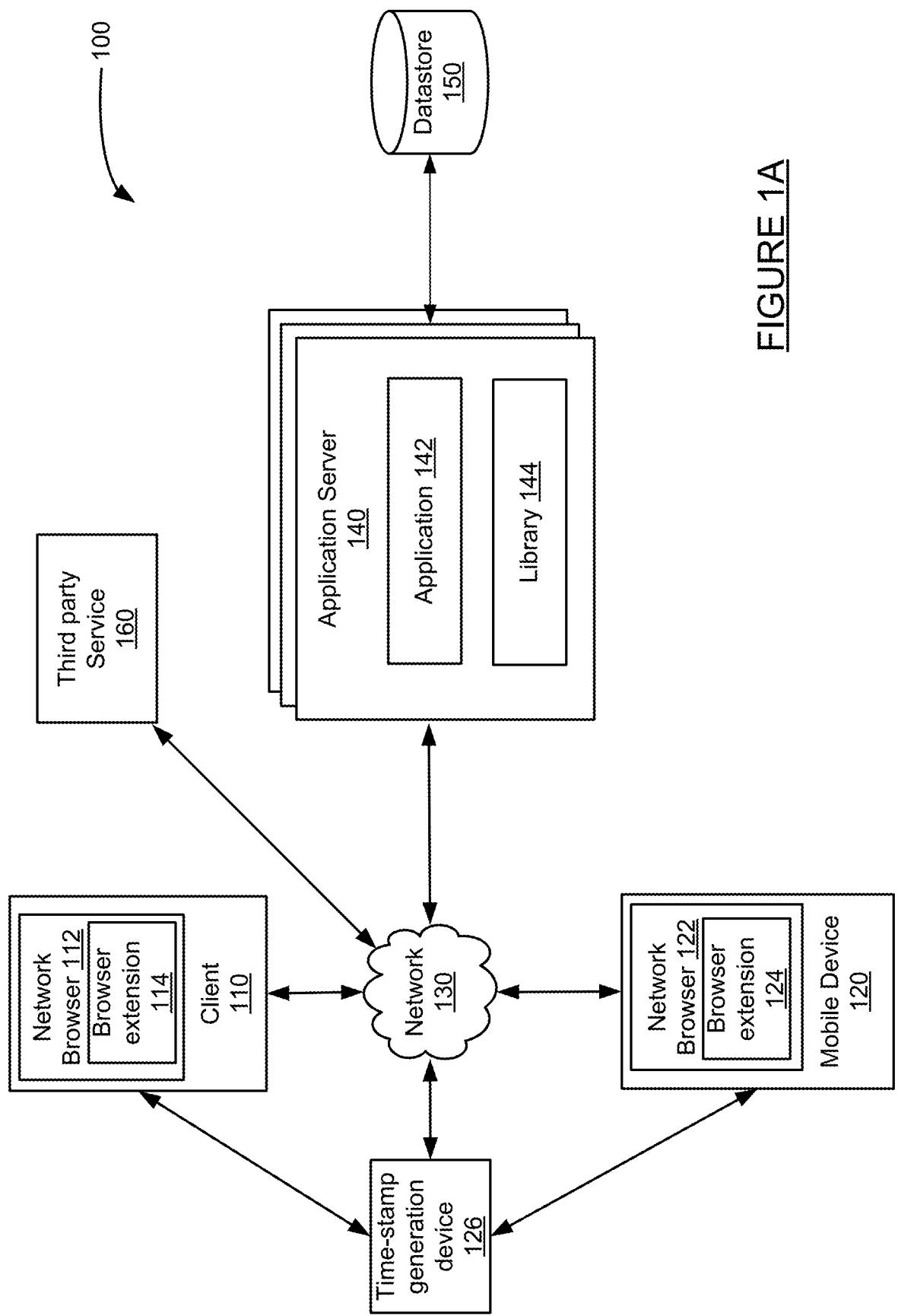
FIG. 1A is a block diagram of a system for manipulating video streams.

The present technology allows a user to quickly and efficiently create, edit, search, playback and share bookmarks in one or more videos that are pre-recorded or being recorded or streaming live. The bookmark includes reference to a portion of the video for a particular amount of time. In some instances, the bookmark portions may not include a specified end time. The bookmark may include the source of the video, a start time of the bookmarked portion of the video stream or file, a length of the referenced video portion, and content such as text, emoticons, or other content received from a user that creates, edits, or manages the bookmark. The bookmarks may be grouped together into a set of bookmarks, thereby forming an edit of the original streaming or pre-recorded videos when played sequentially, wherein the edit includes a set of bookmarked video portions (bookmarked videos) taken from one or more particular live streaming or pre-recorded videos.

The present technology may allow a user to perform several functions with respect to bookmarking a video stream. A user may create a plurality of bookmarks within one or more live streams or videos. Buttons may be provided to the user to create and play back the series of video bookmarks while watching the particular video stream. A user may search for the bookmarks in the particular video, as well as other videos, using a search function and filter function. A user may edit a generated bookmark using simplified two or four-button editing, where one or two buttons adds to the length of the bookmarked video portion and the other one or two buttons reduce the length of the bookmarked video portion. Additionally, patterns of editing, including crowd sourced editing, a video bookmark are tracked and may be used to automatically edit the bookmark. A third-party social networking application may be used to automatically create a bookmark which can be shared with other users in the particular user's network of that social networking platform.

In some instances, the bookmarking functionality described herein may be performed by different components. For example, the functionality described herein may be performed by a browser extension, such as extension 114 or extension 124 in client computing device 110 and mobile device 120, respectively. In this case, the extension may provide graphics, manage bookmarks, handle input with other APIs, and perform other functionality described herein. In some instances, the bookmarking functionality may be performed by application 142 on application server 140, remote from client device 110 or mobile device 120 on which the video and any bookmarks may be viewed. In this case, application 142 may provide graphics, manage bookmarks, and handle input with other APIs, and incorporate graphics content and other content into a content page or video that is streaming to remote client computing device 110 or mobile device 120. In some instances, the bookmarking functionality may be distributed over one or more backend servers and a client device, either on a client application, extension, or in some other code.

The exemplary embodiments of the present technology are discussed below with respect to video bookmarking. It should be noted that references to video bookmarking are exemplary only, and should not be considered to limit the scope of the present technology. For example, the present technology may be used to generate, manage, edit, and playback bookmarks in an audio stream or media rather than video, such as for example an audio stream associated with a pod cast and delivered through a content page. In another instance, the present technology could be used to bookmark the state of a network browser application (i.e., open tabs, websites, cookies, and other browser information at a certain point of time). As such, the present technology can be used with any digital media and may utilize any digital event.

FIG. 1A is a block diagram of a system for manipulating video streams. FIG. 1A includes client 110, mobile device 120, network 130, application server 140, and data store 150. Client 110 and mobile device 120 may communicate with application server 140 over network 130. Client 110 may include a laptop computer, desktop computer, workstation, smart TV, or some other device able to display streaming video to a user and receive input from a user during the streaming video. The client device 110 may receive streaming video from application server 140, third-party service

160, or some other source and provide the streaming video to a user, for example through a network browser 112.

Mobile device 120 may include a smart phone, personal digital assistant, tablet computer, mobile computer, notebook computer, or some other computing device that may output streaming video to a user and receive input from a user during the streaming video. The mobile device 120 may receive streaming video from application server 140, third-party service 160, or some other source and provide the streaming video to a user, for example through a network browser 122.

Timestamp generation device 126 may include any device that receives input from a user and outputs an indication of a time stamp or some event from which a timestamp may be determined and stored. The input may be clicking a button on the device, a mouse input, a recognized or detected gesture, or any other detectable input from a user. Timestamp generation device may initiate the transfer of data to application server 140, third-party service 160, or some other destination upon receiving input from a user. The data transmitted may include a time stamp associated with the time that device 126 received user input, or a time at which a signal or message is received from device 126 by a computing device or application server. The data may include other information as well, such as for example geographical position data for the device at the time the input is received, a device identifier, a user identifier identifying the user which provided the input, a video identifier associated with a video that the input corresponds to, and optionally other data as well.

The output from timestamp generation device 126 may be provided directly to an application server 140, for example through a connection with network 130 via a Wi-Fi network, router, and modem through network 130. In some instances, the output may be provided to an application server, third-party service 160, or other destination through client 110 (or mobile device 120). In this instance, device 126 may be connected to client 110 (or mobile device 120) through a wired connection or a wireless connection such as a Bluetooth connection. The client device 110 (or mobile device 120) may receive data from device 126, and then send it to application server 140 via network 130.

Network 130 may include any of several types of networks to allow machines and computers to communicate with each other, for example to share streaming data, content pages such as webpages, and other data. In some instances, network 130 may include one or more of an intranet, the Internet, a public network, a private network, a cellular network, and a Wi-Fi network.

Application server 140 may include one or more servers that provide content and respond to requests received from client 110, mobile device 120, Time-stamp generation device 126 and Third party Service 160. Application server 140 may communicate directly over network 130, may communicate over network 130 through a network server serving as an intermediary between network 130 and application server 140, or may include a network server 130 within application server 140. In some instances, application server 140 may include a logical network server or a physical network server machine (not illustrated in FIG. 1A)

Application server 140 may include application 142. Application server 140 may provide video streaming and bookmarking functionality to clients 110 and mobile device 120. The bookmarking functionality may include managing bookmarks, providing graphics, icons, text, and other media within a streaming video, communicating with other services and resources via an application program interface (API) manager, and other technology and functionality discussed herein. Application 142 is discussed in more detail with respect to the block diagram of FIG. 1C.

When providing streaming video or other video content to clients 110 and 120 by application server 140, or providing video from another source (not illustrated in FIG. 1) to clients 110 and 120 through application server 140, the video content may include one or more graphical inputs provided within the video display. The graphical inputs may be in the form of a button, slide, or other selectable graphical input that is displayed to a user along with the video being provided. The graphical inputs may be included within the content provided by application server and any of multiple ways. In some instances, when application 142 provides the video content, the graphical inputs may be implemented into a content page that provides the video by application 142 at application server 140. In this case, application 142 may access library 144, which may include one or more libraries, to implement the graphical inputs into the streaming page output by application server 142 to client 110 and mobile device 120. The libraries may include a bookmark creation and editor library, a search library, a bookmark list library, and other libraries that provide for functionality discussed herein.

In some implementations, the graphical inputs may be provided at the client, through a browser extension within a network browser instead of the application server. The browser extension may provide bookmarking functionality that includes managing bookmarks, providing graphics, icons, text, and other media within a streaming video, communicating with other services and resources via an application program interface (API) manager, and other technology and functionality discussed herein. In this implementation, a browser extension 114 installed on network browser 112 and/or browser extension 124 installed network browser 122 can provide the content page to a user of client 110 or mobile device 120, respectively. In particular, for client device 110, browser extension 114 within network browser 112 may provide the graphical inputs within the content page that provides a streaming video output by a client 110. Similarly, in a mobile device 120, when network browser 122 provides a streaming video to a user of device 120, the browser extension 124 may provide the graphical inputs within the content page output by the browser.

In some instances, a client application may be installed on client 110 or mobile device 120 that includes a local application code library and provides bookmarking functionality as described herein. The client application may operate similarly to application 142 but from the perspective of client device 110 or mobile device 120, except that the client application will output streaming video received from application server 140 or third-party service 160.

Application server 140 may communicate with one or more other machines, including data store 150. In some instances, a user may have an account with an application server and user credentials may be stored remotely and data store 150. In this implementation, application server 140 may access user credentials from data store 150 when verifying and authenticating a user. Additional content may be accessed from data store 150 as well, such as for example video content, graphical content, and other content and data. In some instances, data store 140 may include a source of video, such as a network video streaming service.

Third-party service 160 may include any number of services that may interact with the bookmarking system architecture of the present technology. For example, third-party service 160 may include a messaging service that can receive a message from a user, and generate a bookmark based on the time the message was received, one or more keywords that comprise the body of the message, and user information associated with the account that the message originated from. The message may be sent to a recipient implemented as a bot or other automated service that generates a bookmark in response to messages received. Third-party service may also include a time stamp processing service for receiving timestamps from timestamp generation device 126. The timestamp processing service may generate bookmarks based on information received from timestamp generation device 126. Third-party service 160 may include any other servers that may, for example, receive data from a user or a device that can be used to generate a bookmark, edit a bookmark, cancel bookmark, or provide some other function on the bookmark.

Figure 1B:
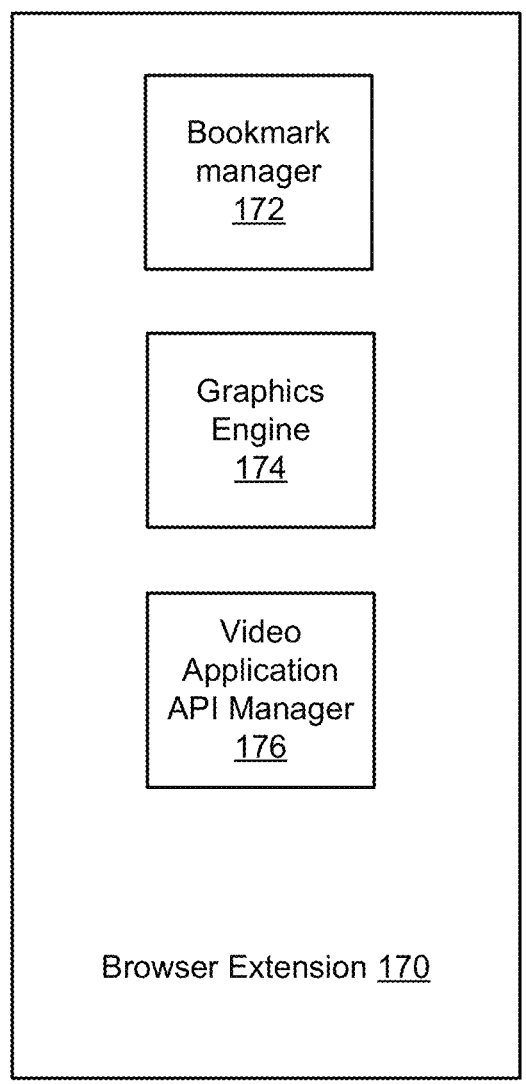
FIG. 1B is a block diagram of a network browser extension.

FIG. 1B is a block diagram of a network browser extension. FIG. 1B provides more detail for browser extension 124 and/or browser extension 114 of the block diagram of FIG. 1A. Network browser extension 170 includes bookmark manager 172, graphics engine 174, and video application API manager 176. Bookmark manager 172 may manage the generation, editing, deletion, and other functions related to bookmarks. Bookmark manager 172 may, in response user input, create a bookmark. Creating a bookmark involves creating a bookmark object that includes and identifier of a video, a time stamp within the video associated with the bookmark beginning, and may include an end time for the bookmark. A bookmark object may include other information as well, including user identification information for the user that created the bookmark, keywords associated with the bookmark, a date and time the bookmark was created, and other data. Bookmark manager 172 may create bookmark objects, edit the objects, and remove the objects. The objects may be stored locally at a client device which includes a browser extension, or remotely at an application server or remote data store at which the bookmark objects can be retrieved by browser extension 170. In response to user input received through a network browser, bookmark manager 172 may also increase or decrease the starting point of a bookmark within a video or increase or decrease the ending point of a bookmark within a video.

Graphics engine 174 may provide graphical icons, text, images, and other media within a streaming video received by a device in which browser extension 170 is implemented. The graphics may include a thumbnail or other indicator for a particular generated bookmark, keywords associated with the bookmark, an interface for performing bookmarking functions, an icon selectable to generate a new bookmark, text that may implement a header that describes a video or a set of bookmarks currently being managed, as well as other selectable icons that can for example be used to view a history of bookmarks created, a collection of the current user's bookmarks, and other information and data. Examples of graphics implemented within a streaming video are illustrated in the exemplary interfaces of FIGS. 7-11.

Video application API manager 176 may communicate with third-party services to communicate data and information. API manager 176 may, for example, communicate with a messaging application to retrieve bookmarking instructions and data received in a message format, communicate with an Internet of Things backend application or Internet of Things remote device to receive messages associated with the creation of a bookmark through the Internet of Things device (such as device 126 in FIG. 1), communicate with video streaming services that stream video over a network to a computing device or mobile device, and communicate with other third-party services.

It should be noted that modules 172-176 are discussed as exemplary modules only. Extension 170 may include more or fewer modules, and modules may be combined or divided into additional modules, in order to implement bookmarking and other functionality described herein.

Figure 1C:
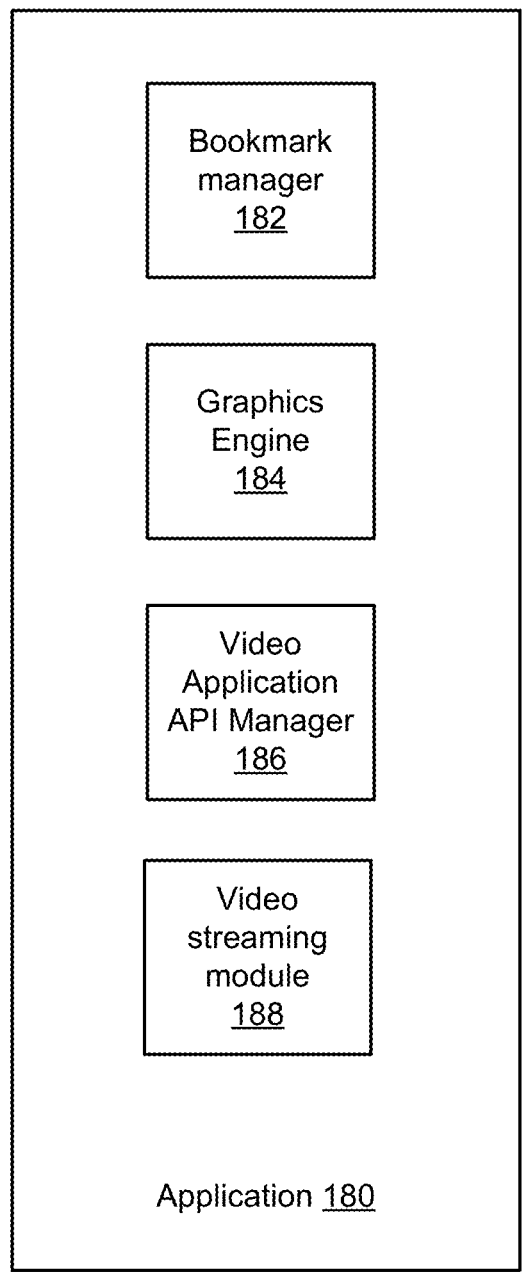
FIG. 1C is a block diagram an application.

FIG. 1C is a block diagram an application. The application of FIG. 1C provides more detail for application 142 of FIG. 1. Application 180 includes bookmark manager 182, graphics engine 184, video application API manager 186, and video streaming module 188. Modules 182-186 may generally operate in a very similar manner as modules 172-176 of extension 170 discussed with respect to FIG. 1B, except that the modules operate from a remote application rather than on a client itself. As such, graphics may be implemented within the video being streamed to a client from the point of view of an application server rather than being added to streaming video received by a client from a remote application server. Accordingly, video streaming module 188 is included within application 180, and provides streaming video functions such as delivering the streaming video, preparing the data for streaming, and incorporating graphics, icons, text, and other information from graphics engine 184 into the video that is streamed to a remote device such as client computing device 110 and mobile device 120.

It should be noted that modules 18-182 are discussed as exemplary modules only. Application 180 may include more or fewer modules, and modules may be combined or divided into additional modules, in order to implement bookmarking, streaming, and other functionality described herein.

Figure 2:
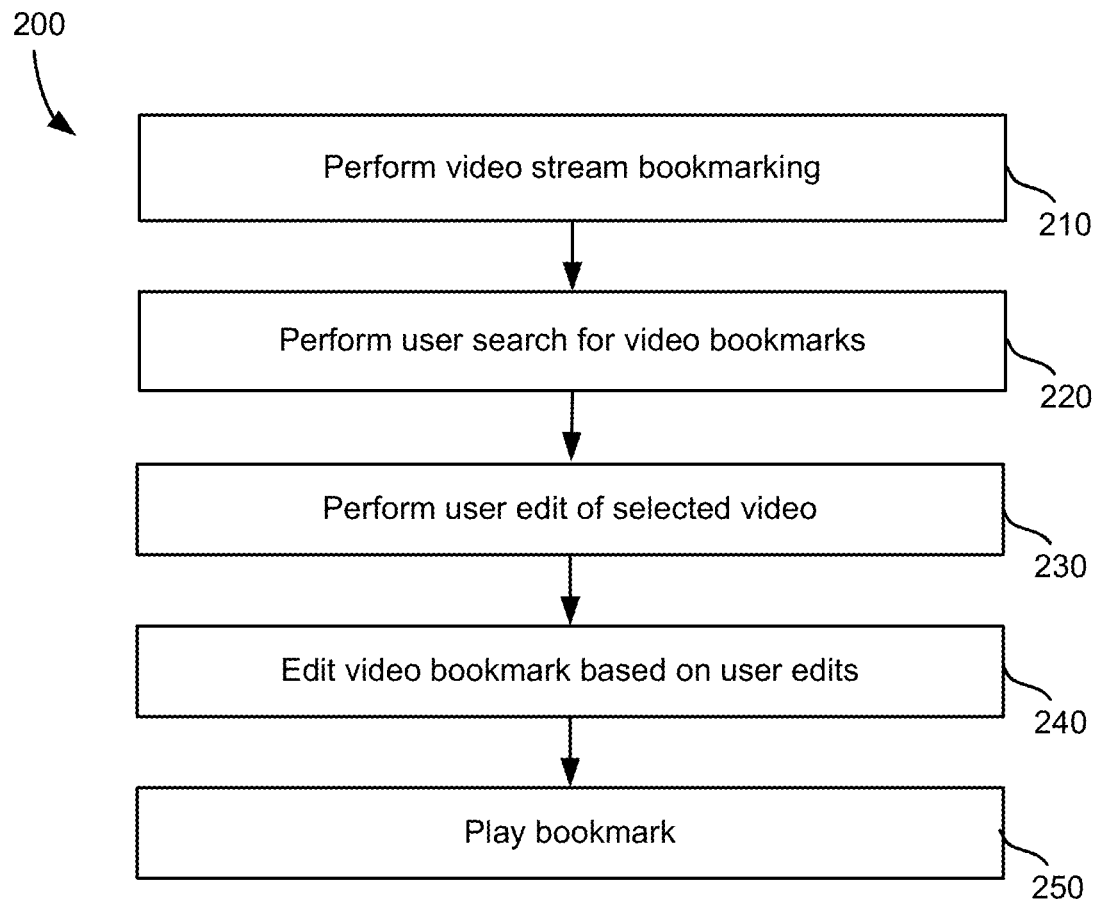
FIG. 2 is a method for providing bookmarking functionality in the context of video content.

FIG. 2 is a method for providing bookmarking functionality in the context of video content. FIG. 2 begins with providing video stream bookmarking to a user at step 210. As a user is viewing a video stream, a user may provide input to a device, ultimately received by application server 140, to create a bookmark within a video stream. The bookmark may be created through input received through an intuitive interface provided within the streaming video itself. Bookmarks may be created while watching a previously recorded video or simultaneously while recording a video. Performing video stream bookmarking while watching a video is described in more detail with respect to the method of FIG. 3. Performing video stream bookmarking while creating a video is described in more detail with respect to the method of FIG. 4.

A user may search for videos at step 220. Searching for videos may include receiving a keyword from a user. The keyword may be provided by the client or mobile device to application 142. In an example of video searching performed by application 142, application 142 may access one or more functions in a library 144 to perform a search of bookmark videos based on the keywords received. Searching for video bookmarks is described in more detail below with respect to the method of FIG. 5.

User edits of selected videos may be performed at step 230. In addition to creating video stream bookmarks, the user that created the bookmark or other users may edit a particular bookmark at step 230 additional details for editing a selected video bookmark are discussed with respect to the method of FIG. 6.

A video bookmark may be edited based on user edits at step 240. Automatic video bookmark edits may be performed in one of several ways. In some instances, a video bookmark may be edited every time a particular user edits the bookmark. For example, if any user edits a video bookmark by adding a selected period of time to the start of the video bookmark, the particular bookmark may be edited to add a fraction of the total time to the start of the bookmark. In this case, the bookmark will not be changed drastically every time a particular user edits the bookmark, but it will be adjusted to reflect each edit. Over time, if several users edit a bookmark similarly, such as for example to add a particular amount of time to the start of the bookmark, the bookmark will eventually be noticeably changed to include more time at the start of the bookmark. In some implementations, if a threshold number of users request to add time to a start of the bookmark, or to the end of a bookmark, the particular amount of time will be added to the start or end of the bookmark. Editing a bookmark is discussed in more detail below with respect to the method FIG. 6.

A bookmark may be played at step 250. To play a bookmark, a bookmark may be selected by a user, either from a bookmark interface that includes bookmarks created by a user, and from search results that can include user-created bookmarks as well as bookmarks created by other users. In response to receiving a selection of a bookmark, the video is accessed from its location and loaded into a player or network browser if not already loaded, and the portion of the video corresponding to the start time of the bookmark begins playback.

Figure 3:
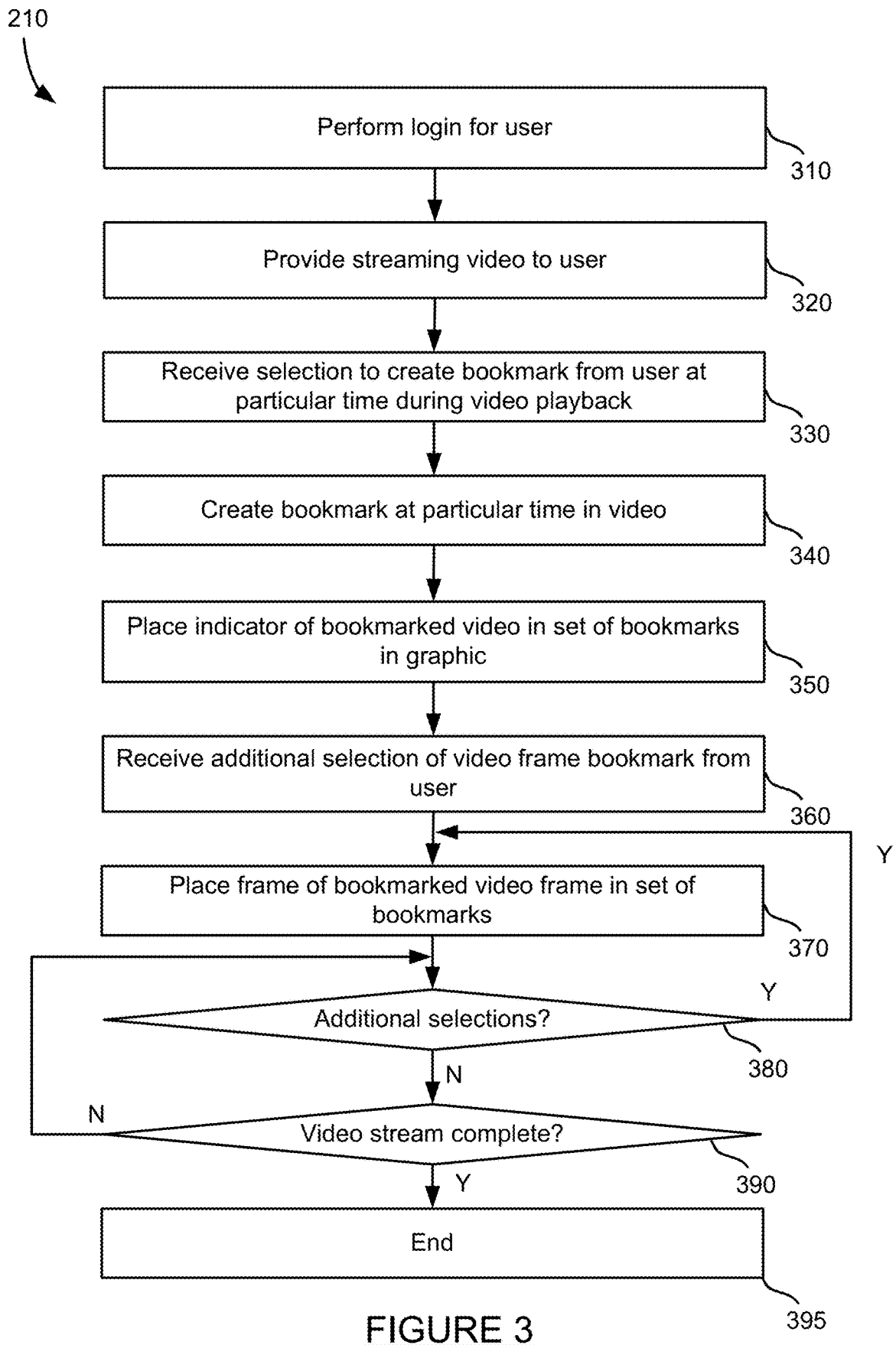
FIG. 3 is a method for providing video stream bookmarking while watching video.

Playing a bookmark may be part of a request to play a set of bookmarks. When a set of bookmarks is selected by a user, the video is accessed and loaded, and playback begins from the start time stamp associated with the first bookmark. After the first bookmark playback has completed, the video jumps to the start time stamp of the next bookmark (this may require a separate video to be accessed and loaded) and begins playback of the video that corresponds to that subsequent bookmark's start time stamp. The process continues for each bookmark in the set of bookmarks. In some instances, a bookmark from the middle of a set may be played. Also, as this happens, the remaining sub-set of bookmarks will be sequentially played FIG. 3 is a method for providing video stream bookmarking while watching video. In some instances, the video stream bookmarking may be provided on the same device with which the user is viewing the videos that are pre-recorded or streaming live. The method of FIG. 3 provides more detail for step 210 of the method of FIG. 2. Login credentials may be received to identify the user at step 310. Login may include receiving a username and password for user, confirming the received login information matches account data for the particular user, or creating an account for the particular user, and then providing bookmarking services to the user. In some instances, login may be optional, only implemented if the user wants to save one or more bookmarks with a user account, or not implemented at all.

A selected streaming video may be provided to a user at step 320. In some embodiments, user login is not required, and video may stream before any unique identification of the user.

A selection of a portion of the video to bookmark may be received from the user at step 330. To create the bookmark, application 142 at application server 140 may store the source of the video, a time stamp associated with the time within the video duration that was selected by the user, optionally the end time of the bookmark, and content received by the user such as keywords associated with the bookmark, and the information is stored as a bookmark object. The bookmark object may include other data as well, including a user identifier, geographical information associated with where the user or the computing device used by the user was when the bookmark was created, narration, emoticons, comments, and other data. Once a selection is received, a bookmark may be created for the particular video portion at step 340. The bookmark may be stored locally at a computing device, as well as at a remote library such as library 144 at application server 140.

An indicator, such as a thumbnail, of the bookmarked video is placed in a collection of bookmark indicators within an interface provided over the streaming video at step 350. In some instances, the thumbnail may be associated with the particular video, and may be selectable by user to access the bookmarked video portion of the particular video. The indicator may be provided with a numerical identifier, one or more keywords received by user to be associated with the bookmark, and in some instances other information. Examples of a bookmarking interface that includes video thumbnails are provided in FIGS. 8-10. Other indicators may be used in addition to or instead of thumbnails, such as for example text, graphical icons, and other data.

An additional selection of a portion of the video to bookmark may be received by user at step 360. Upon receiving an additional selection from the user, the indicator of the bookmark is added to the interface that includes in the bookmarks, and in particular alongside the first created bookmark, at step 370. The bookmark is created in response to receiving user selection in a similar manner as that associated with the creation discussed with respect to step 340.

A determination is made as to whether additional selections for creating bookmarks are received from user at step 380. If additional selections are received, the method of FIG. 3 returns to step 370. If additional selections have not been received, a determination is made as to whether the video stream is complete at step 390. If the video stream is not complete, method of FIG. 3 continues to step 380. In some implementations, when a video stream completes, the process of adding bookmarks may continue via bookmarks from other videos added to the present set of bookmarks. If video stream is complete at step 390, the method of FIG. 3 ends at step 395.

Figure 4:
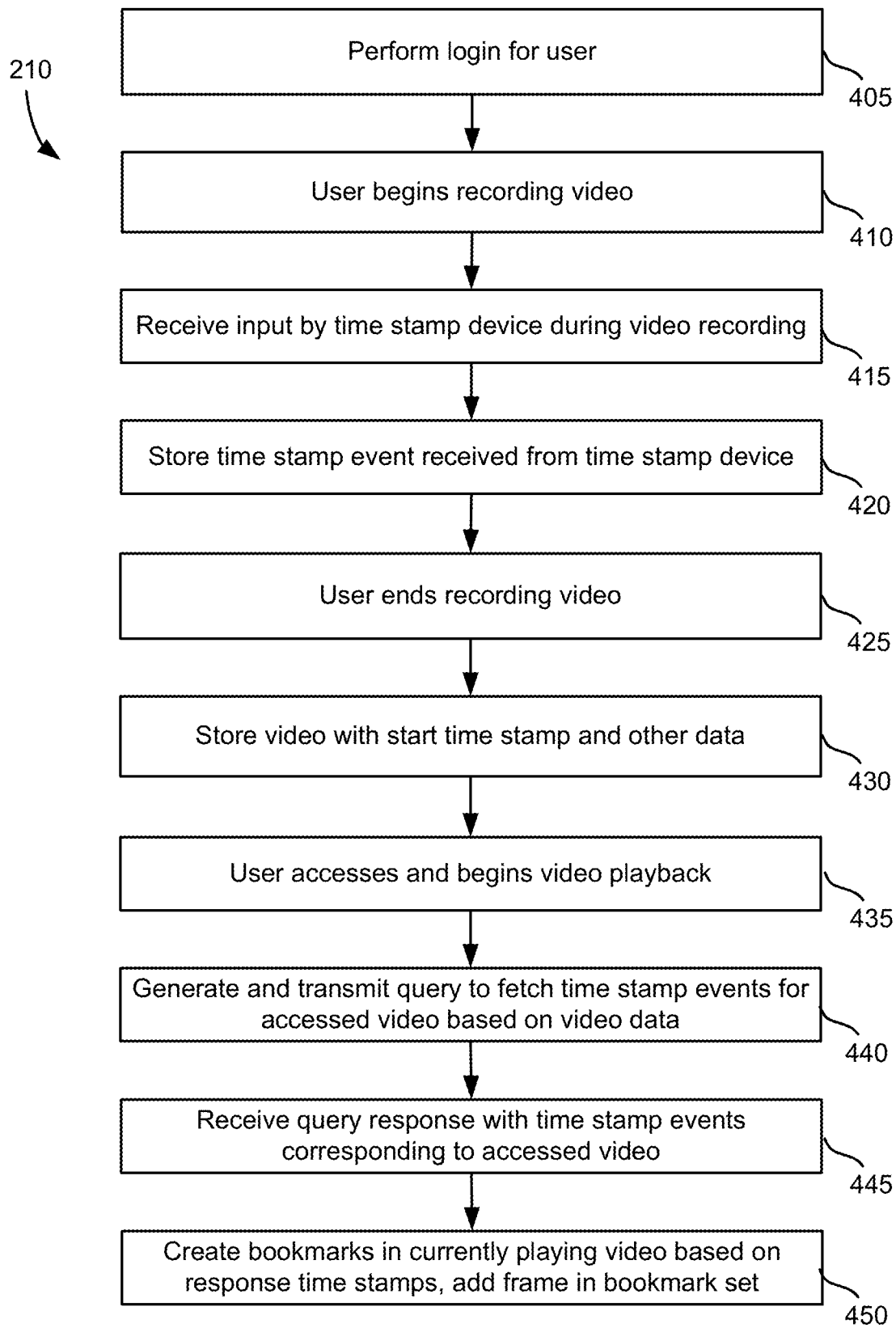
FIG. 4 is a method for providing video stream bookmarking using an external device.

FIG. 4 is a method for providing video stream bookmarking using an external device. In some instances, the device used to create the bookmark is separate from a device the user may employ to record or watch a line or pre-recorded video. The method of FIG. 4 provides more detail for step 210 in the context of creating a bookmark during video recording. First, login may be formed by user at step 405. The user login may be similar to the process described for login associated with step 310 in FIG. 3. Next, a user may begin recording video at step 410. Video recording may be generated from a mobile device, video camera, web cam, or any other device that captures video. When the video is recorded, the resulting video file may include an initial time at which video crew recording began, geographical information associated with the geographical position associated with where the video was created, and optionally other data as well.

Input may be received by a time stamp device during video recording at step 415. The timestamp device, for example device 126 in FIG. 1, may be any device that receives input from a user that creates a time stamp. Examples are a simple Internet of Things time stamp creation device, a messaging application that receives a text message intended for a recipient that may be used to create a bookmark, a motion detection device that recognizes gestures or motions and records the time at which they were detected, or any other device that receives an input and may record and transmit a time stamp indicating when the input was received. Timestamp the vent received from the timestamp device is stored at step 420. The information may be stored locally at it can be feuding device in communication with the Internet of Things or other timestamp device 126, a remote application server, or a remote third-party service. Information in addition to the timestamp may also be received and transmitted to the bookmarking system, such as for example geographical information as to where the input was received, user identification information, video identification information, and other data.

Video recording may and at step 425. The video with the start timestamp and other data may then be stored at step 430. Video may be stored locally at a computing device, remotely at an application server, or provided to a third-party service that streams data to be viewed in a local client application or network browser.

Sometime after the videos recorded or initially watched, user may access and begin video playback of the video referenced between steps 410 and 425 at step 435. At some point after the user initiates playback of the video, a query may be made to fetch timestamp events for the access video based on video data at step 440. The query is received, for example by an application 142, and may be processed to identify any suitable timestamp events. Suitable timestamp events are those having a time stamp the falls near or between the creation date and time and ending date and time, determined by the duration of the video and the creation date and time of the video. In some instances, other data may also be used to search for suitable timestamp events, such as geographical information, video identification information, and user identification information. For example, if the geographical information for the video and the geographical information for the timestamp event are within a particular threshold, such as for example 500 feet, thousand feet, a mile, or some other threshold distance, then the particular timestamp event having a time stamp within the duration of the video would be determined to be a matching timestamp event for the query. Similarly, if the timestamp events included video identification information and user identification information, those parameters may be used to search for matching timestamp events based on the corresponding user and video identification information for the particular video the query is based on. These associated bookmarks may be grouped into sets based on the external device, such as time-stamp generating device 126 or third party service 160, that generated the bookmarks.

A query response is received by the querying entity, for example a browser extension, client application, or an application, at step 445. Bookmarks are then created for the currently playing video based on the response timestamp events at step 450. Thumbnails or other indicators of each bookmark are then displayed within an interface within the streaming video at step 450 as well.

In some instances, bookmarks are automatically created based on timestamp events that satisfy a query generated at step 450. In some instances, the bookmarks may be retrieved by the query but a user may be prompted to confirm whether or not one or more of the bookmarks should be associated with the particular video. Prompting the user to confirm bookmarks may be suitable in cases where there is less information from which to determine suitable timestamp events. For example, if timestamp events are retrieved based on only timing information for the particular video, and geographical, video identifier, and user identifier information is not used to select timestamp events, the query may return a large number of timestamp events. If the number of timestamp events is greater than a threshold number, such as five, ten, or twenty, the system may query a user to select from the retrieved timestamps.

The method of FIG. 4 describes a process for generating bookmarks using an external device while recording a video. In some instances, a similar process may be used for creating a bookmark using a Timestamp generating device 126 while watching a video or live stream. In this case, information regarding when the user was watching a portion of video would be used to compare timestamp event data to determine which portion of video was being watched when the timestamp event occurred. The timing information associated with when a user was watching video may be stored by third-party service, retrieved by an application from the third-party service to be processed, captured by an extension or client applications located on the device in which the user was watching the video, or otherwise obtained and stored by the present system.

Figure 5:
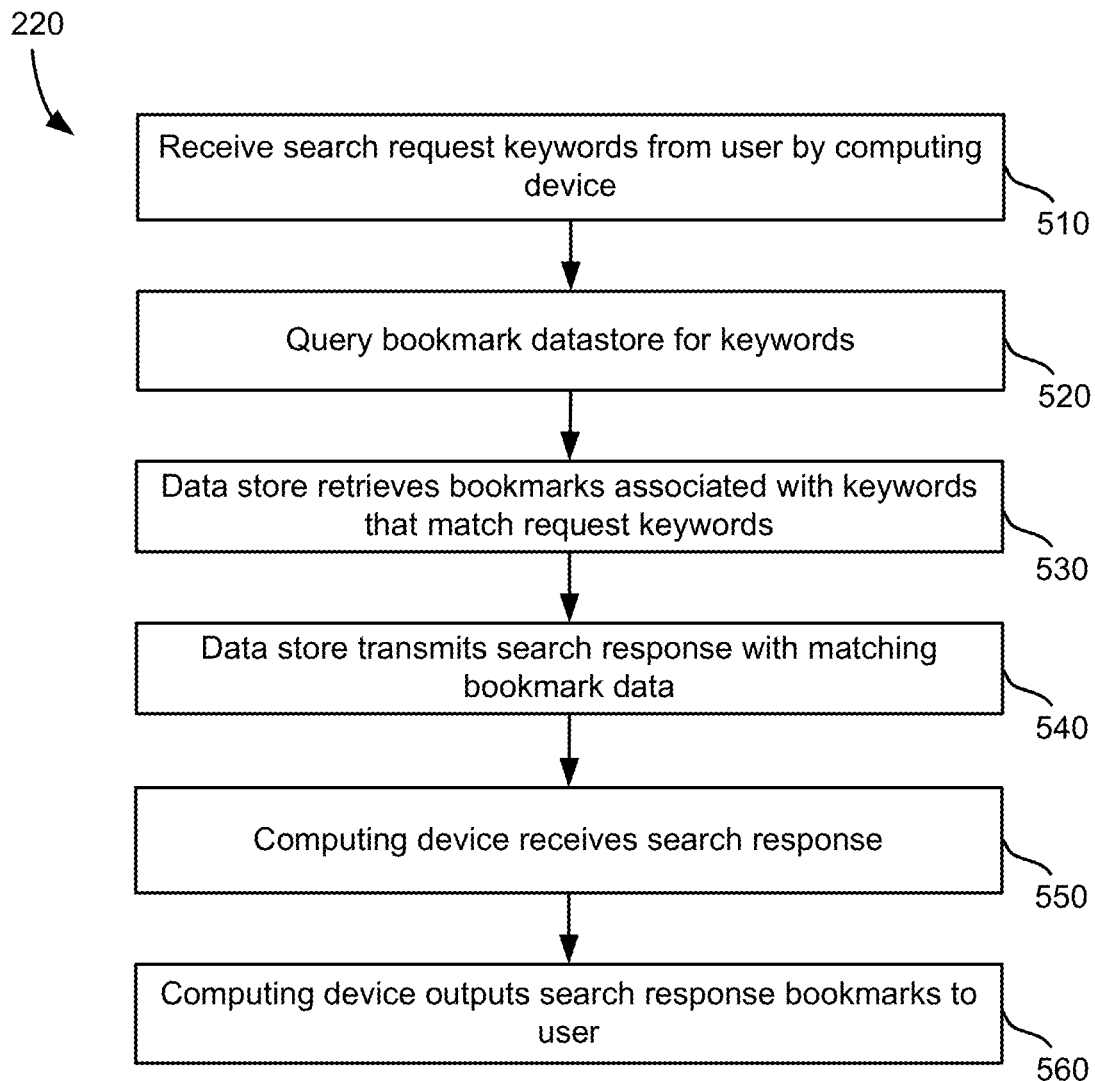
FIG. 5 is a method for searching video bookmarks.

FIG. 5 is a method for searching video stream bookmarks. The method of FIG. 5 provides more detail for step 220 the method of FIG. 4. First, search request keywords are received from a user by computing device at step 510. In some instances, other data may be received from a user and used as a search parameter, including but not limited to geographical information associated with where the user or the computing device used by the user was when the bookmark was created, narration, emoticons, comments, and other data. Keywords (or other search parameters) may be received through an interface, such as that provided by a network browser, that may be used to send a query back to an application which may search for particular bookmark data.

The bookmark data store is then queried for the keywords at step 520. In some instances, application 142 may query data store 150 for bookmarks that match the keywords received from the user at step 510.

The data store may retrieve the users own bookmarks as well as other users' public bookmarks associated with the keywords in the query at step 530. Thus, the retrieved bookmark data may not just pertain to bookmarks created by the user performing the search. Rather, the search initiated by the user may cover public bookmarks/keywords generated by other users as well. The data store then transmits a response to the requesting application with the matching bookmark data at step 540. The application receives a response and forwards the bookmark data in the response to a computing device at step 550. The computing device may then output the bookmarks matching the keywords (or other search parameters) requested by the user at step 560. Once the search result(s) are provided to the user, a bookmark within the results may be selected by the user, such as for example by positioning a mouse over a result and receiving a mouse click. Once selected, the user may be provided with the portion of the video associated with the start time of the selected bookmark.

By searching bookmarks associated with portions of a video rather than the title and brief description of the video, search results are provided that have a much finer granularity then the entire video. This allows a search result to navigate directly to the most relevant portion of a video that is associated with search request keyword rather than having to navigate to an entire video.

Additionally, since bookmarks may be viewed and manipulated by any user, including manipulation that adds keywords to a particular bookmark, each portion of video may be associated with a rich selection of keywords that enable the most relevant bookmark video portions to be returned in a particular search.

Figure 6:
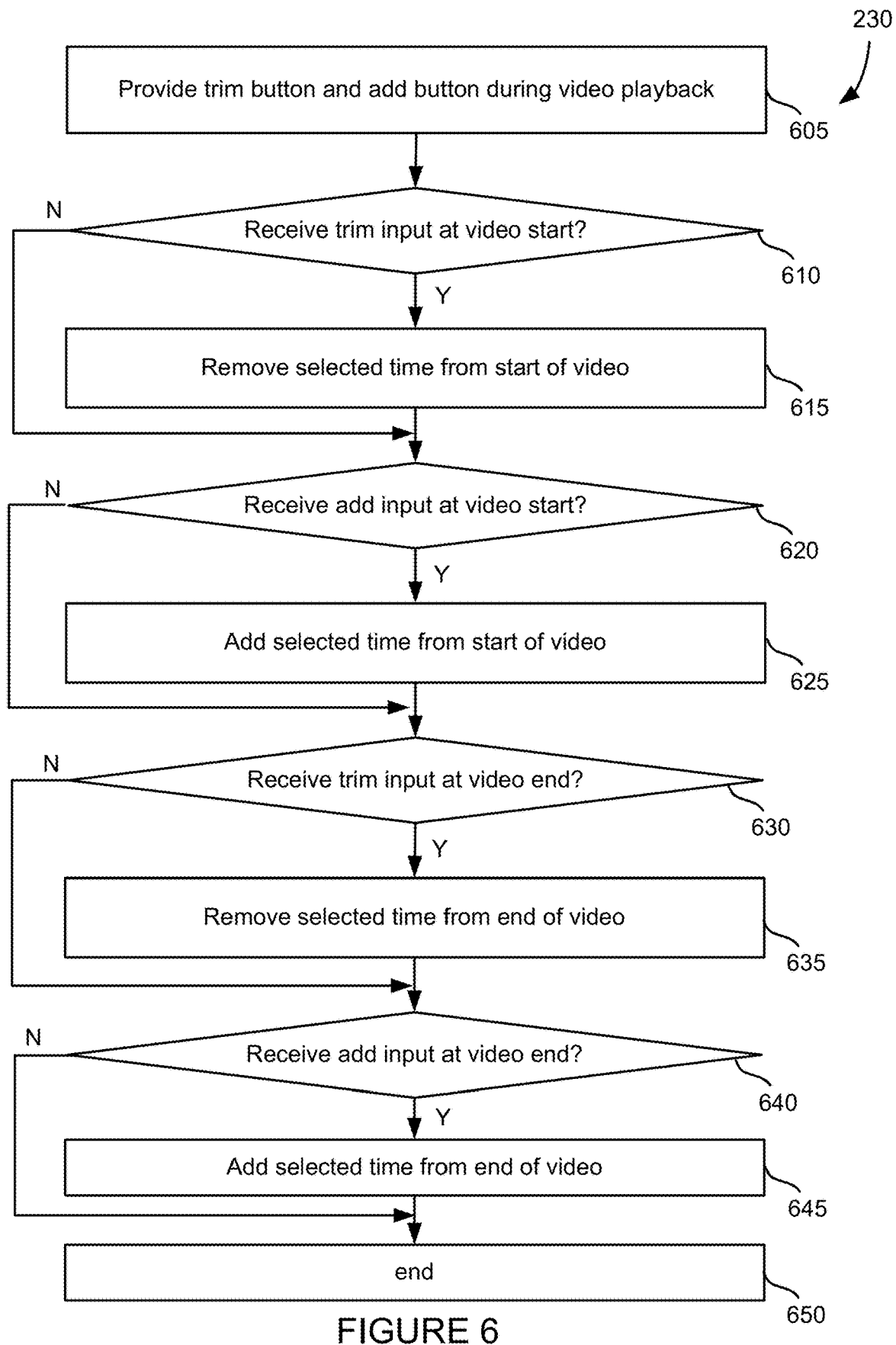
FIG. 6 is a method for performing edits of selected bookmarks.

FIG. 6 is a method for performing user edits of selected videos. FIG. 6 provides more detail for step 230 of the method of FIG. 2. During playback of a video, one or two trim buttons and one or two add buttons are provided during video playback. In some instances, the add button and trim button may be one of any number of graphical inputs that are provided along with a streaming video. The graphical elements may be provided by a browser plug-in or code library on a local device, as part of the content page provided by a remote application, or some other source.

A determination is made as to whether trim input is received at the start of a bookmarked video portion at step 610. The trim input may act to reduce a portion of the video at the start of the bookmarked video portion. The trim input may be received when a user provides input to select the trim button provided through a network browser. Input may be determined to be applicable to a bookmarked video portion start if the input is received at any time, within the first half of a video, a first third of the bookmarked video portion, a first set time of the bookmarked video portion such as for example 10 seconds, or some other set time period. If no input is received at step 610, the method of FIG. 6 continues to step 620. If trim input is received at step 610, a selected time is removed from the start of the bookmarked video portion at step 615. For example, in response to receiving a trim input, the first three seconds of the bookmarked video portion may be removed from the bookmarked video portion. In some implementations, a different amount of time may be reduced from the start the bookmarked video portion in response to the trim input. In some implementations, the trim button may be used to trim a video bookmark portion at the current point of playback. In any case, the amount of time taken from the bookmarked video (corresponding to a portion of the video) may be a predetermined period of time, a period of time identified by user, a period of time previously configured by a user, or some other time. After removing the selected time from the start of the video, the method of FIG. 6 continues to step 620.

A determination is made as to whether an add input is received at the start of the bookmarked video portion at step 620. This input may add time from a streaming video to a selected bookmark video. If input is not received to add to the start of the bookmarked video portion, method of FIG. 6 continues to step 630. If input is received at step 620, a selected period of time of video is added to the bookmarked video portion at step 625. The added time may be a predetermined period of time, such as for example 10 seconds or some other period of time. The predetermined period of time may be determined by user or set as a default by the present technology. In some implementations, the user may provide input regarding how much time to add to the bookmarked video portion. After adding the selected time to the start of the bookmarked video portion, method of FIG. 6 continues to step 630.

A determination is made as to whether an input to trim the bookmarked video portion is received at step 630. If no input is received to trim the end of the bookmarked video portion, method of FIG. 6 continues to step 640. If input is received to trim the end of the bookmarked video portion, the selected time may be removed from the end of the bookmarked video portion at step 635. Input to trim the end of a bookmarked video portion may be received as a trim input received at any time, during the second half of the bookmarked video portion, within a certain window within the end of the bookmarked video portion such as one minute, or input received at some other time. The selected time may be removed from the end of the bookmarked video portion as a predetermined amount of time, such as for example 3 seconds, or the time to be removed may be configured by a user. After removing the selected time from the end of the bookmarked video portion, the method of FIG. 6 continues to step 640.

A determination is made as to whether an add input to a bookmarked video portion is received at step 640. If no input is received to add video to the end of a bookmarked video portion, the method of FIG. 6 ends at step 650. If input is received to add video at the end of the bookmarked video portion, a selected time is added to the end of the bookmarked video portion at step 645. Method of FIG. 6 then ends at step 650.

In some implementations, a portion of a streaming video may be bookmarked using the functionality of a third-party application. For example, a third-party social networking platform, in particular a messaging third-party application, may be used to create a bookmark. An example will be discussed using the messaging platform provided by Twitter, Inc., of San Francisco, Calif. A message may be sent, such as a tweet, to an account maintained on the social network messaging service or containing a particular keyword. In some instances, the message may be sent to any of one or more accounts that contain the particular keyword. In response to detecting the message is sent to the particular account or containing a particular keyword, the present technology may prompt a user to select from a plurality of streams that the user may currently be viewing. If the user is currently viewing a stream, the stream time is noted by the present technology. If the user is viewing a video, the time during playback is currently noted. A bookmark is an automatically created for the particular stream or video. The bookmark is used to demarcate a portion of the video, and provides a link to the particular bookmark for the user to access, manage, and edit.

Figure 7:
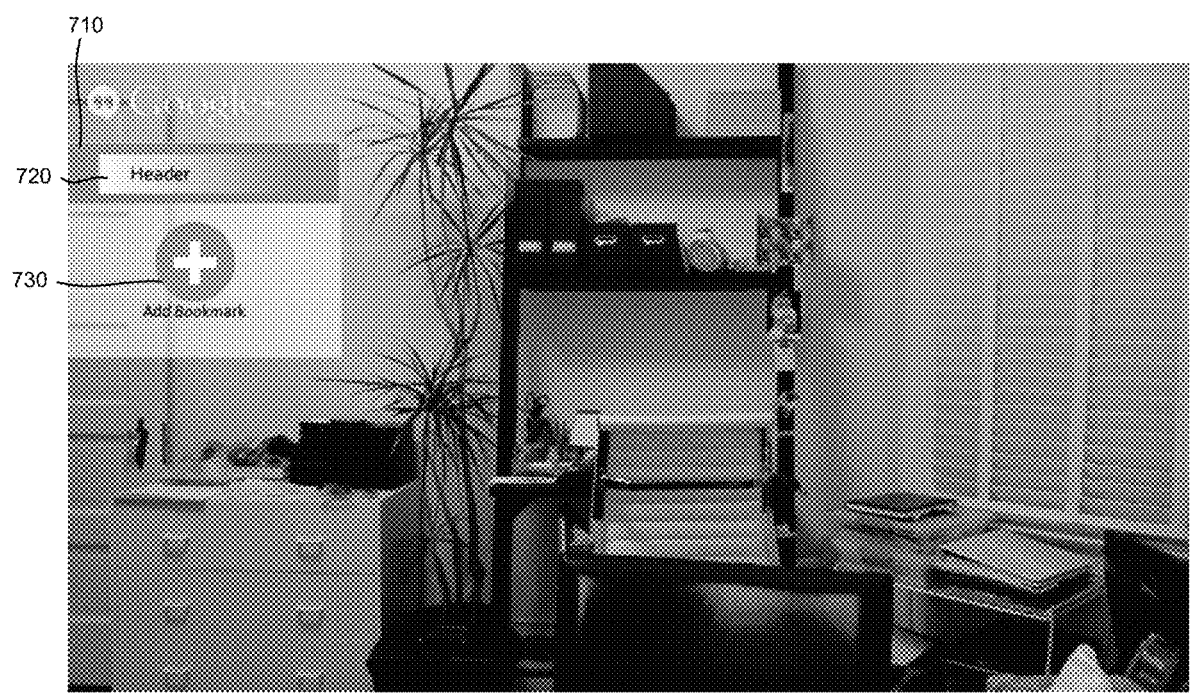
FIGS. 7-12 are screen shots of a bookmark interface.

FIGS. 7-11 are screen shots of an exemplary bookmark interface. The bookmark interfaces of FIGS. 7-11 are provided at different points during playback of a streaming video provided through a network browser. In FIG. 7, the bookmark interface 710 is provided without any selected bookmarks. As such, the interface includes a header 720 that reads "header," and an indicator 730 that, when selected, adds a bookmark at the current time in playback at which the indicator 730 is selected. Selection of indicator 730 may be received for example when a cursor is place over the indicator followed by a mouse click.

In some instances, the interface 710 is only displayed within the streaming video when a cursor is placed within the footprint to be occupied by the interface. For example, the interface 710 is provided in the left side of the video near the top edge of the video. Hence, if a cursor is placed along the bottom of the video, the middle the video, or the right of the video, or any other place where the interface footprint would not exist, the interface would not be displayed. The interface is displayed once a user positions a cursor within the video, near the top left of the video, where the interface would be displayed.

Figure 8:
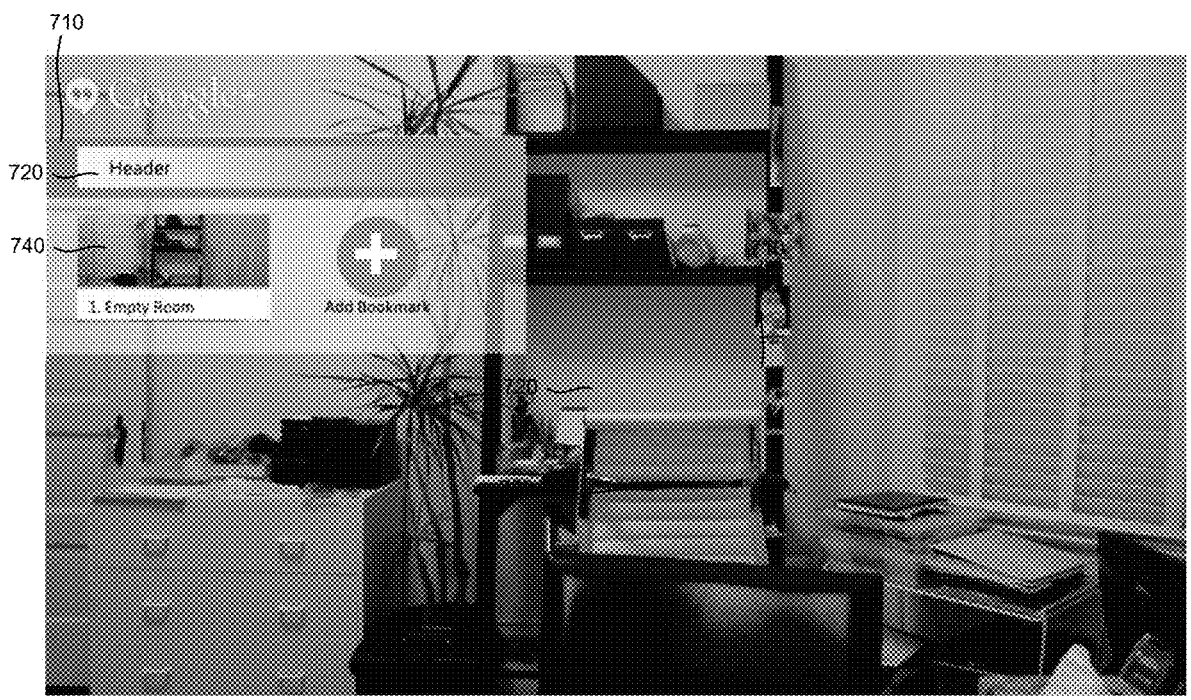

In FIG. 8, the bookmark interface is displayed with a first bookmark within the interface. After indicator 730 is selected at a particular point during video playback, a bookmark object may be created. The bookmark object creation results in an indicator for the bookmark being placed within the interface. Indicator 740 is placed within interface 710 to indicate that a first bookmark has been created for the particular video. The indicator 740 includes a thumbnail for the particular bookmark as well as key words of "Empty Room."

Figure 9:
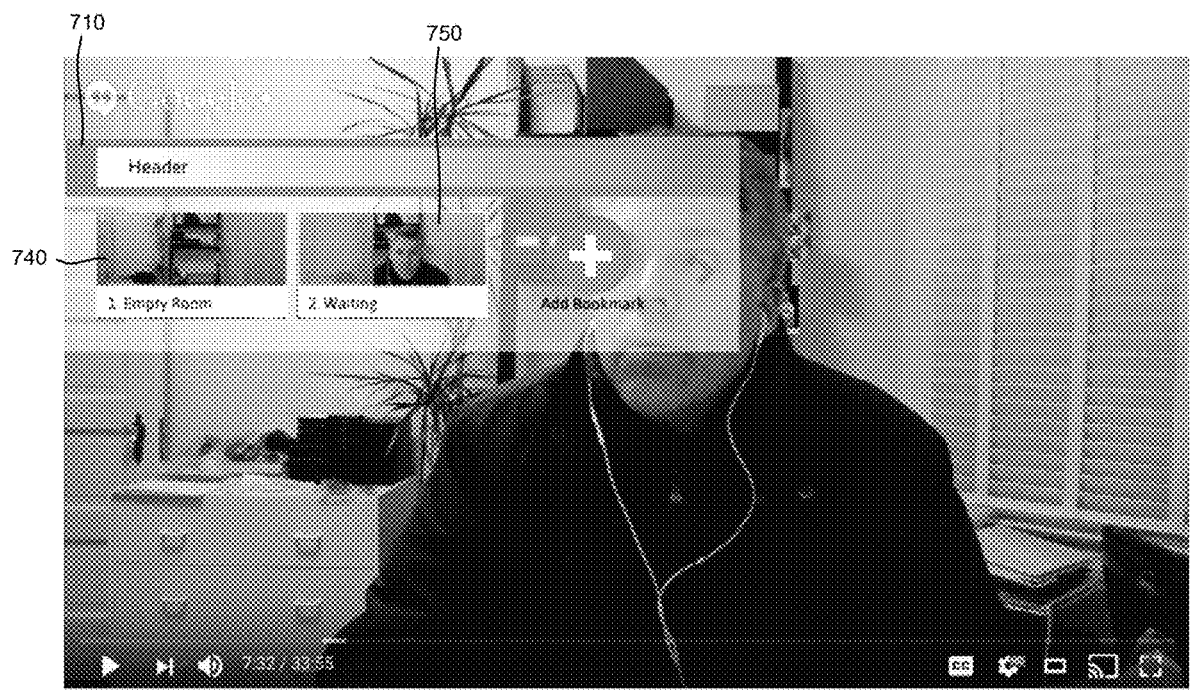

In FIG. 9, the bookmark interface is displayed with a second bookmark in addition to the first bookmark within interface 710. After indicator 730 is selected at a second time during video playback, a second bookmark object may be created. The bookmark object creation results in an indicator 750 being placed within the interface 710. Indicator 750 is placed within interface 740 alongside indicator 710 to indicate that a second bookmark has been created for the particular video. The indicator 750 includes a thumbnail for the particular bookmark as well as key words of "Waiting."

Figure 10:
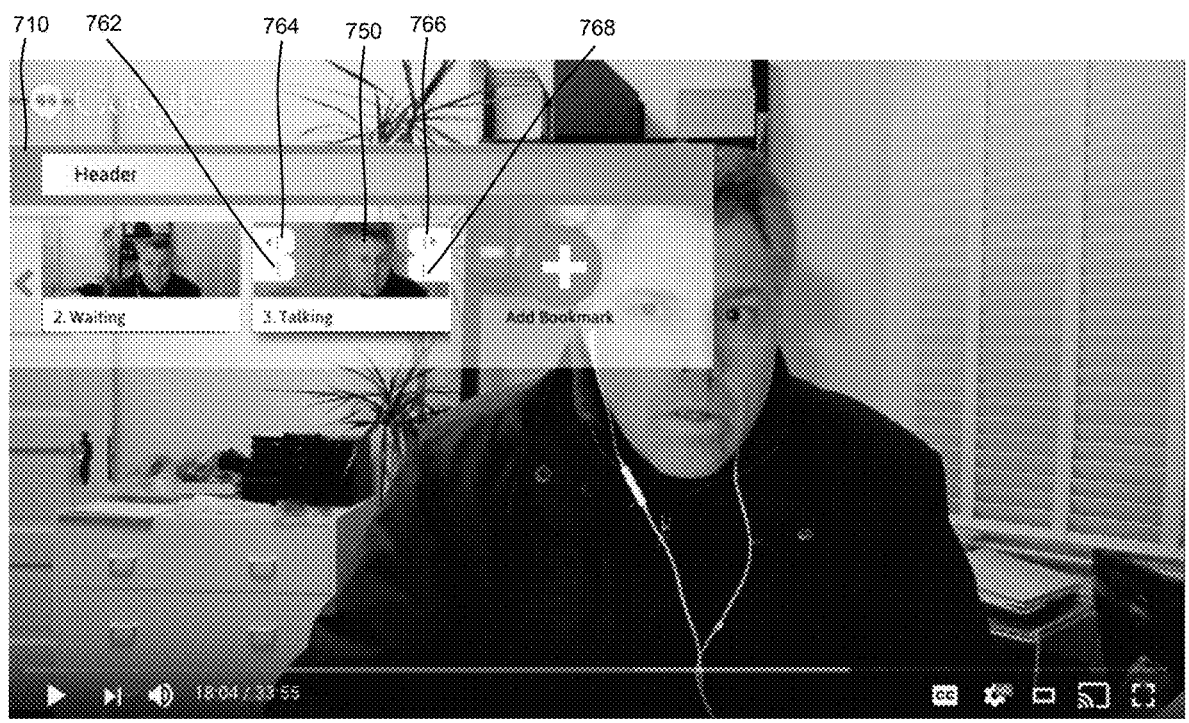

FIG. 10 illustrates a third bookmark indicator 750 within interface 710 and includes a thumbnail and key words of "talking." The indicator 750 also includes editing icons 762, 764, 766, and 768. The editing icons can be used by a user, or any other user that accesses the video bookmark, to edit the start time and end time of the bookmark. For example, the start time of the bookmark may be edited using selectable graphic icons 764 and 762. When icon 764 is selected, the start time of the bookmark associated with indicator 750 will be pushed to an earlier point in the video (increasing the bookmark video duration), by a certain period of time, such as for example 2 seconds, five seconds, 10 seconds, or some other period of time. When icon 762 is selected, the starting time of the bookmark will be moved forward by a period of time (decreasing the bookmark video duration), such as two seconds, four seconds, five seconds, ten seconds, or any other period of time.

Similarly, the end time of a bookmark may be manipulated using selectable icons 766 and 768. When icon 766 is selected, the end time of a bookmark is pushed out by a period of time (increasing the duration of the bookmark video), such as two seconds, five seconds, or 10 seconds. When icon 768 is selected, the end time of a bookmark is moved up (decreasing the bookmark video duration) by a period of time, such as two seconds, five seconds, or ten seconds.

By placing the selectable start time editing icons within the bookmark indicator 750, a mechanism is provided for an unobtrusive way to edit the duration of the bookmark while being able to watch the video itself. When a user selects a bookmark indicator 750, the bookmark is streamed through a network browser and provided to a user, and an indicator may progress along a length or width of a portion of indicator 750, such as for example the thumbnail. When the start time is increased or decreased using indicator 762 and 764, the thumbnail or another part of the indicator may change.

Figure 11:

FIG. 11 illustrates interface 710 with additional information that may be displayed. When selecting an indicator within interface 710, such as a header, or other indicator (not illustrated in FIGS. 7-10), additional information for a user may be displayed. The additional information may include a history 770 created bookmarks as well as other sets of bookmarks 780 associated with the user.

Figure 12:

FIG. 12 illustrates an interface for editing a bookmark on a mobile device. As shown in FIG. 12, the start time of the bookmark may be moved earlier in the video by receiving user input of icon 790, the start time of the bookmark may be moved later in the video by receiving user input of icon 791, the end time of the bookmark may be moved earlier in the video by receiving user input of icon 792, and the end time of the bookmark may be moved later in the video by receiving user input of icon 793.

Figure 13:
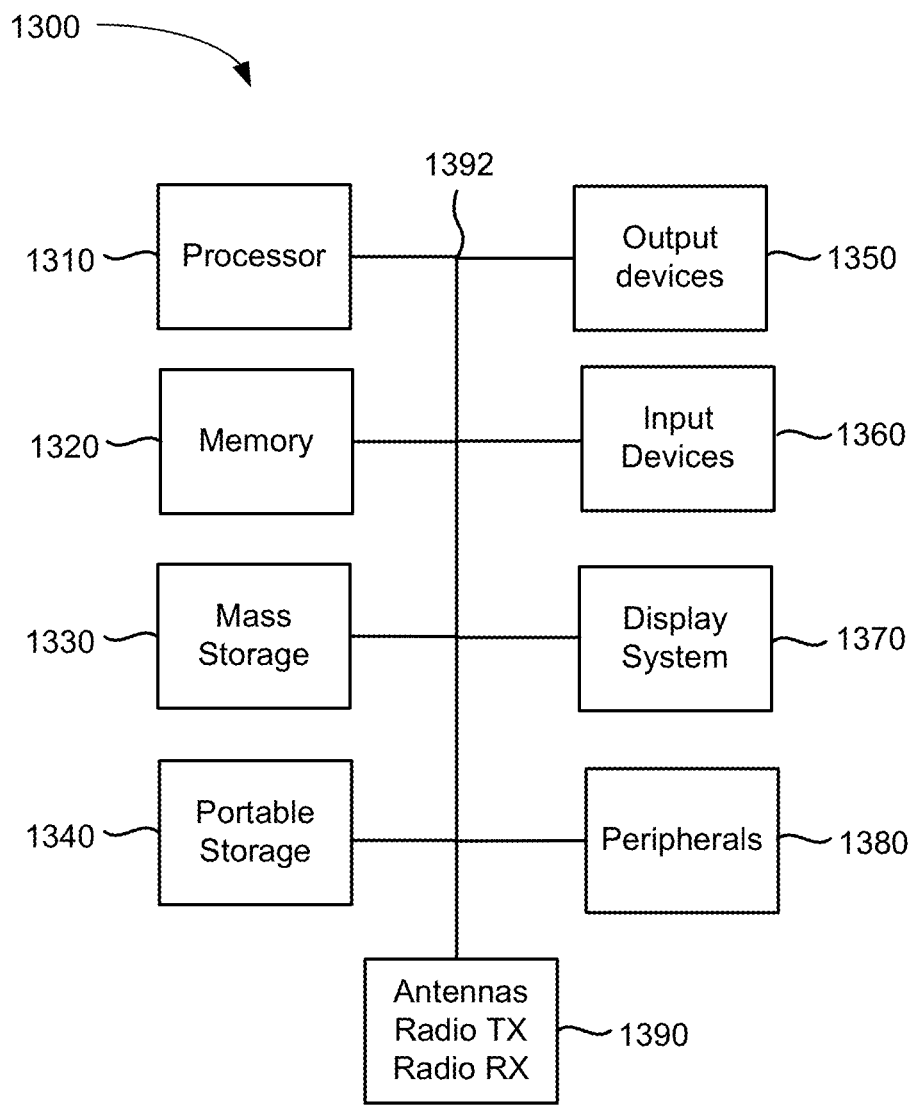
FIG. 13 is a block diagram of a computing environment for implementing the present technology.

FIG. 13 is a block diagram of an exemplary system for implementing the present technology. System 1300 of FIG. 13 may be implemented in the contexts of the likes of client 110, mobile device 120, device 126, application server 140, and data store 150. The computing system 1300 of FIG. 13 includes one or more processors 1310 and memory 1320. Main memory 1320 stores, in part, instructions, and data for execution by processor 1310. Main memory 1320 can store the executable code when in operation. The system 1300 of FIG. 13 further includes a mass storage device 1330, portable storage medium drive(s) 1340, output devices 1350, user input devices 1360, a graphics display 1370, and peripheral devices 1380.

The components shown in FIG. 13 are depicted as being connected via a single bus 1390. However, the components may be connected through one or more data transport means. For example, processor unit 1310 and main memory 1320 may be connected via a local microprocessor bus, and the mass storage device 1330, peripheral device(s) 1380, portable storage device 1340, and display system 1370 may be connected via one or more input/output (I/O) buses.

Mass storage device 1330, which may be implemented with a magnetic disk drive, an optical disk drive, a flash drive, or other device, is a non-volatile storage device for storing data and instructions for use by processor unit 1310. Mass storage device 1330 can store the system software for implementing embodiments of the present invention for purposes of loading that software into main memory 1320.

Portable storage device 1340 operates in conjunction with a portable non-volatile storage medium, such as a floppy disk, compact disk or Digital video disc, USB drive, memory card or stick, or other portable or removable memory, to input and output data and code to and from the computer system 1300 of FIG. 13. The system software for implementing embodiments of the present invention may be stored on such a portable medium and input to the computer system 1300 via the portable storage device 1340.

Input devices 1360 provide a portion of a user interface. Input devices 1360 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 1300 as shown in FIG. 13 includes output devices 1350. Examples of suitable output devices include speakers, printers, network interfaces, and monitors.

Display system 1370 may include a liquid crystal display (LCD) or other suitable display device. Display system 1370 receives textual and graphical information, and processes the information for output to the display device. Display system 1370 may also receive input as a touch-screen.

Peripherals 1380 may include any type of computer support device to add additional functionality to the computer system. For example, peripheral device(s) 1380 may include a modem or a router, printer, and other device.

The system of 1300 may also include, in some implementations, antennas, radio transmitters and radio receivers 1390. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 1300 of FIG. 13 are those typically found in computer systems that may be suitable for use with embodiments of the present invention and are intended to represent a broad category of such computer components that are well known in the art. Thus, the computer system 1300 of FIG. 13 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, iOS, Android, and other suitable operating systems, as well as programming languages such as Java, C, C++, Node.JS, and .NET.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for creating a bookmark for a video, comprising:
storing, by an application stored in memory and executing on an application server, a plurality of bookmark data sets for one or more videos, each of the plurality of bookmark data sets including start data associated with when a particular video portion begins within the one or more videos, wherein the one or more videos includes the plurality of video portions;
receiving a video request by the application server from a remote computing device, the video request transmitted by the remote computing device in response to:
submitting a video content query by the remote computing device to a third-party server, and
receiving data associated with at least one of the plurality of bookmark data sets by the remote computing device from the third-party server, wherein the received data includes a location of a content page and at least one of the plurality data sets; and
transmitting a content page to the remote computing device by the application server in response to receiving the video request, the content page including the video portion associated with the at least one of the plurality of bookmark data sets received by the remote computing device from the third-party server;
the content page providing a bookmark interface during playback of the video portion, the bookmark interface including an indicator associated with the video portion, the video portion associated with the bookmark and one or more keywords, the content page:
receiving input to adjust the length of the bookmark, adjusting the start data and the length of the video portion in response to the received input; and
storing an updated bookmark data set for the video portion, the updated bookmark data set reflecting the adjusted length of the video portion.

2. The method of claim 1, wherein the bookmark data set includes one or more of the source of the digital media, a geographical location, a user identifier, and a digital media identifier.

3. The method of claim 1, wherein the remote device includes a bookmark program stored and executed as an extension to a network browser application, the bookmark application adjusting the start data and the length of the video portion.

4. The method of claim 1, wherein the remote device includes a bookmark program stored and executed as an application on a server remote to the device displaying the bookmark interface, the bookmark application adjusting the start data and the length of the video portion.

5. The method of claim 1, wherein the input to adjust the length of the bookmark is received through the bookmark interface displayed on the device.

6. The method of claim 1, wherein the input to adjust the length of the bookmark is initiated by a remote time-stamp generation device.

7. The method of claim 6, wherein the input from the time-stamp generation device is received while recording the digital media.

8. The method of claim 6, wherein the input from the time-stamp generation device is received while watching the digital media.

9. The method of claim 1, wherein the bookmark interface includes a selection mechanism to add a bookmark.

10. The method of claim 1, wherein the bookmark interface is not displayed during digital media playback unless a predetermined input is received.

11. The method of claim 10, wherein the predetermined input includes placing a cursor in a designated portion of a frame of the digital media frame.

12. The method of claim 1, further including performing a search for portions of digital media associated with a bookmark based on search parameters received from a user,
the portions of video including the particular video portion, the particular video portion being a subset of the video,
the search including the video content query transmitted by the remote computing device and received by the third-party server, the third-party server implementing a search engine.

13. The method of claim 12, wherein the performed search covers bookmarks created by the user requesting the search as well as bookmarks created by other individuals.

14. The method of claim 1, further comprising receiving input to playback the bookmark.

15. The method of claim 1, further comprising receiving input to playback a set of bookmarks including the bookmark.

16. The method of claim 1, wherein the start data includes a time stamp, the time stamp representing a time during playback of the video at which the particular video portion begins.

17. The method of claim 1, wherein the start data includes a time lookup value, the start time of the particular video portion within the video being accessed from the time lookup value.

18. The method of claim 1, wherein the at least one of a plurality of data sets includes a network address for the content page provided by the application server.

19. A system for creating a bookmark for a digital media, the system comprising:
a processor;
a memory; and one or more modules stored in the memory and executable by the processor to perform operations including:
  storing, by an application stored in memory and executing on an application server, a plurality of bookmark data sets for one or more videos, each of the plurality of bookmark data sets including start data associated with when a particular video portion begins within the one or more videos, wherein the one or more videos includes the plurality of video portions;
  receiving a video request by the application server from a remote computing device, the video request transmitted by the remote computing device in response to:
    submitting a video content query by the remote computing device to a third-party server, and
    receiving data associated with at least one of the plurality of bookmark data sets by the remote computing device from the third-party server, wherein the received data includes a location of a content page and at least one of the plurality data sets; and
  transmitting a content page to the remote computing device by the application server in response to receiving the video request, the content page including the video portion associated with the at least one of the plurality of bookmark data sets received by the remote computing device from the third-party server;
  the content page providing a bookmark interface during playback of the video portion, the bookmark interface including an indicator associated with the video portion, the video portion associated with the bookmark and one or more keywords, the content page:
    receiving input to adjust the length of the bookmark,
    adjusting the start data and the length of the video portion in response to the received input; and
    storing an updated bookmark data set for the video portion, the updated bookmark data set reflecting the adjusted length of the video portion.

20. A non-transitory computer-readable storage medium having embodied thereon a program, the program being executable by a processor to perform operations for creating a bookmark for a digital media, the operations comprising:
  storing, by an application stored in memory and executing on an application server, a plurality of bookmark data sets for one or more videos, each of the plurality of bookmark data sets including start data associated with when a particular video portion begins within the one or more videos, wherein the one or more videos includes the plurality of video portions;
  receiving a video request by the application server from a remote computing device, the video request transmitted by the remote computing device in response to:
    submitting a video content query by the remote computing device to a third-party server, and
    receiving data associated with at least one of the plurality of bookmark data sets by the remote computing device from the third-party server, wherein the received data includes a location of a content page and at least one of the plurality data sets; and
  transmitting a content page to the remote computing device by the application server in response to receiving the video request, the content page including the video portion associated with the at least one of the plurality of bookmark data sets received by the remote computing device from the third-party server;
  the content page providing a bookmark interface during playback of the video portion, the bookmark interface including an indicator associated with the video portion, the video portion associated with the bookmark and one or more keywords, the content page:
    receiving input to adjust the length of the bookmark,
    adjusting the start data and the length of the video portion in response to the received input; and
    storing an updated bookmark data set for the video portion, the updated bookmark data set reflecting the adjusted length of the video portion.

* * * * *